United States Patent
Zaviska et al.

[11] Patent Number: 6,048,038
[45] Date of Patent: Apr. 11, 2000

[54] BREAKING PRESSURE REGULATOR

[75] Inventors: Dalibor Zaviska, Eppstein/Ts.; Peter Volz, Darmstadt, both of Germany

[73] Assignee: ITT Manufacturing Enterprieses, Inc., Wilmington, Del.

[21] Appl. No.: 08/894,174

[22] PCT Filed: Mar. 1, 1996

[86] PCT No.: PCT/EP96/00857

§ 371 Date: Oct. 15, 1997

§ 102(e) Date: Oct. 15, 1997

[87] PCT Pub. No.: WO96/28325

PCT Pub. Date: Sep. 19, 1996

[30] Foreign Application Priority Data

Mar. 9, 1995 [DE] Germany ............................ 195 08 329

[51] Int. Cl.[7] ...................................................... B60T 8/34
[52] U.S. Cl. ............................... 303/113.1; 303/DIG. 4; 303/155; 303/160
[58] Field of Search ........................... 303/113.1, DIG. 3, 303/DIG. 4, 191, 198, 9.69, 15, 155, 160

[56] References Cited

U.S. PATENT DOCUMENTS

| | | | |
|---|---|---|---|
| 4,414,630 | 11/1983 | Harris et al. | 303/DIG. 4 |
| 4,788,490 | 11/1988 | Valaas | 324/62 |
| 4,881,784 | 11/1989 | Leppek | 303/DIG. 4 |
| 4,990,854 | 2/1991 | Friz | 324/418 |
| 5,261,731 | 11/1993 | Yogo et al. | 303/DIG. 4 |
| 5,293,551 | 3/1994 | Perkins et al. | 361/154 |
| 5,454,291 | 10/1995 | Ulm et al. | 91/445 |
| 5,481,187 | 1/1996 | Marcott et al. | 324/207.16 |
| 5,501,514 | 3/1996 | Resch et al. | 303/115.4 |

FOREIGN PATENT DOCUMENTS

| | | | |
|---|---|---|---|
| 231 113 A2 | 8/1987 | European Pat. Off. | 303/DIG. 3 |
| 0 627 350 | 12/1994 | European Pat. Off. | |
| 20 21 185 | 11/1970 | Germany . | |
| 22 57 236 | 5/1974 | Germany . | |
| 34 46 016 | 6/1986 | Germany . | |
| 40 04 059 | 8/1991 | Germany | 303/113.1 |
| 41 21 470 | 1/1992 | Germany . | |
| 44 40 531 | 5/1995 | Germany . | |
| 56-39946 | 4/1981 | Japan | 303/DIG. 4 |
| 4-39151 | 2/1992 | Japan | 303/DIG. 4 |
| 4-63753 | 2/1992 | Japan | 303/DIG. 4 |
| 2 182 740 | 5/1987 | United Kingdom . | |
| 93/08055 | 4/1993 | WIPO . | |
| WO 93/15939 | 8/1993 | WIPO | 303/DIG. 4 |

Primary Examiner—Paul N. Dickson
Assistant Examiner—Jeffrey Woller
Attorney, Agent, or Firm—Rader, Fishman & Grauer PLLC

[57] ABSTRACT

A braking pressure control system comprises a braking pressure generator, a brake-actuating device for at least one vehicle wheel, a connecting line between the braking pressure generator and the brake-actuating device, a shut-off valve in the connecting line which has two switching positions, the connecting line being open in the basic position of the shut-off valve and the connecting line being closed or throttled in the switched position of the shut-off valve, including an outlet line which connects the brake-actuating device to a pressure fluid collecting means, an electromagnetically operated pressure-limiting valve in the outlet line, a wheel sensor which determines the rotational speed of the vehicle wheel and issues a corresponding sensor signal, and an electrical controlling and evaluating unit which has an input for the sensor signal and a first switching output to which a switching signal for the shut-off valve is applied, and a control output which issues a control signal for the current-supply circuit of the coil of the pressure-limiting valve that determines the intensity of the coil current. The objective is to measure the wheel cylinder pressure with simple means. To this end, the coil current circuit is associated with a measuring device which determines a current/voltage variation due to a change in the induction of the coil and sends a corresponding signal to another input of the evaluating unit.

3 Claims, 3 Drawing Sheets

BREAKING PRESSURE REGULATOR

BACKGROUND OF THE INVENTION

The present invention relates to a braking pressure control system including a braking pressure generator, a brake-actuating device for at least one vehicle wheel, a connecting line between the braking pressure generator and the brake-actuating device, a shut-off valve in the connecting line which has two switching positions, the valve keeping the connecting line open in its basic position and closing or throttling the connecting line in its switched position, an outlet line which connects the brake-actuating device with a pressure fluid collecting means, an electromagnetically operated pressure-limiting valve in the outlet line having an adjustable opening pressure, a wheel speed sensor which senses the rotational speed of the vehicle wheel and issues a corresponding sensor signal, and an electronic controlling and evaluating unit which has an input for the sensor signal and a first output (switching output) to which a switching signal for the shut-off valve is applied, and has another output (controlling output) to which a control signal for the current-supply circuit is applied that determines the intensity of current supplied to the solenoid of the electromagnetically operated pressure-limiting valve.

German published Patent Application No. 20 21 185 discloses a brake system of this type. In the braking pressure control system mentioned in the application, a pressure-limiting valve is operated by a proportional magnet. One feature of a proportional magnet is that the force applied to the armature is proportional to the coil current irrespective of the position of the armature in the coil. When a magnet of this type is used to actuate a valve closure member, the closing force is determined by the coil current alone, irrespective of how remote the outflowing pressure medium will remove the closure member from the valve seat.

In the state of the art mentioned above, the closure member is retained on the valve seat by a rigid spring so that the opening pressure of the pressure control valve is above the maximum possible braking pressure which does not yet cause wheel lock. The operating force produced by the solenoid causes the opening pressure to decrease with rising current intensity.

The objective of a pressure control valve of this type is to replace a corresponding switching valve in the outlet line. The switching valves which are normally inserted into the outlet line have two switching positions, i.e. an open and a closed position. Pressure reduction is achieved by briefly opening the switching valve in intervals until the pressure is sufficiently decreased. It is obvious that a pressure control valve renders possible a considerably more accurate control because the desired pressure can be adjusted directly. The condition for this adjustment, however, is a precise knowledge of the control operations and the employment of an electronic evaluating unit which determines control signals for energizing the solenoid of the braking pressure control valve in consideration of sensor signals and cognizant of the control operation.

In anti-lock control systems, frequently, only the first time derivative of the rotational speed of the wheel (the wheel deceleration) is used to govern the control operation.

When the wheel deceleration exceeds a negative threshold value, anti-lock control will respond by removing pressure fluid from the wheel brake.

It has already been found that a control which takes into account the wheel deceleration does not furnish good results. Therefore, suggestions have been made to determine the slip values of the wheel and to adjust the braking pressure so that the slip of the wheel is in a range in which the adhesion coefficients are at the maximum. To determine the wheel slip, however, it is necessary to know the vehicle speed. But the vehicle speed is difficult to determine during a braking operation when the wheels of the vehicle do not roll freely. Therefore, hypothetical speeds have been introduced by way of which approximated slip values could be determined.

British Patent Application No. 2 182 740 discloses measuring the pressure in the wheel brake during a braking pressure control operation. The pressure is proportional to the brake force applied by the brake actuating device. The force which acts between tires and road surface can be determined in consideration of the wheel deceleration. The value of vehicle deceleration is obtained when the last mentioned value is added for all four wheels and divided by the vehicle mass. The speed of the vehicle, at any time of braking, may be derived from this value by a time integration. Because the wheel rotational speed is also known from the evaluation of the wheel sensor signals, the slip of the wheels can be calculated.

Therefore, an additional pressure sensor is used in the above mentioned publication.

German Patent Application No. 34 46 016 discloses a method of determining an optimal slip value. The publication also discloses determining the vehicle speed. To this end, the pressure in the master brake cylinder and the wheel rotational speed is measured. The objective is to improve and simplify the identification of the optimal brake slip by measuring the pressure in the wheel brake cylinder and the vehicle speed. A method of measurement is not indicated.

SUMMARY OF THE INVENTION

Therefore, an object of the present invention is making available, by little additional effort and structure, quantities for the above mentioned calculating methods or other methods to be used for rendering the braking pressure control operation more exact.

This object is achieved by a measuring device which is associated with the coil current circuit for the braking pressure control valve and determines the current-voltage variations due to variations in the induction of the coil and issues a signal (valve signal) derived therefrom to another input of the controlling and evaluating electronic unit.

The disclosed arrangement makes use of the fact that a variation of the induction of the coil is linked to the movement of the armature which is connected to the valve closure member. Variations in inductions in a resonant circuit cause variations in current and voltage which can be measured.

A remarkable movement of the closure member or the armature exists when the pressure in the brake-actuating device, which is the braking pressure, reaches the opening pressure of the pressure control valve. This may be the case when the pressure in the brake-actuating device rises and the valve is cracked open when the opening pressure is reached. Another possibility is that the opening pressure is initially below the pressure in the actuating device. Pressure fluid is discharged by way of the open pressure control valve until the opening pressure is reached and the valve closes again.

In both cases, the pressure in the actuating device prevailing at the point of time of closing or opening of the valve corresponds to the respectively set opening pressure. The opening pressure, in turn, is determined by the coil current intensity. Thus, when the signal of the above-mentioned measuring device, by way of which the opening and closing operation can be identified, is linked to the current intensity prevailing at these points of time, an information about the pressure in the brake-actuating device is produced. From this follows that there is no need for an additional pressure sensor. The corresponding measuring device can be realized very easily by electronic means.

As described in the above mentioned British publication, the instantaneous vehicle speed can be determined very easily by way of the wheel braking pressure. Eventually, the brake slip can be determined this way.

Further, the master brake cylinder pressure can also be determined without the need for an additional sensor. A control operation includes different phases, i.e., a pressure decrease phase, a pressure hold phase and a pressure increase phase. A pressure decrease phase is realized because the shut-off valve closes the connecting line and the pressure-limiting valve is acted upon by a current which causes decrease of the opening pressure. As soon as the opening pressure is lower than the instantaneous braking pressure, the pressure control valve will open, and pressure fluid is discharged from the brake-actuating device. The pressure control valve will not close until the braking pressure corresponds to the opening pressure again. This pressure value can be memorized in the controlling and evaluating unit. The above operation is repeated until the wheel deceleration has been reduced below a defined threshold value. A pressure hold phase or a pressure increase phase may then follow. The pressure value which was memorized as the last corresponds to the braking pressure at the commencement of a respective phase.

The opening pressure of the pressure control valve can be reincreased already in the hold phase. This does not yet cause an increase in braking pressure because the shut-off valve remains closed. Pressure fluid can be conducted to the actuating device only by opening of the shut-off valve. This causes an increase in pressure until the opening pressure of the pressure control valve is reached. As explained hereinabove, the opening action can be recorded, and the corresponding opening pressure which corresponds to the braking pressure prevailing at that point of time can be memorized. The pressure increase in the wheel brake can be determined by the braking pressure at the beginning of the hold phase and the braking pressure measured as the last. Further, the duration of opening of the shut-off valve is known in the art. Also known is the throttling characteristics of the shut-off valve. The pressure in the braking pressure generator can be calculated from these figures. In order to cause a defined increase in braking pressure, a defined quantity of pressure fluid must flow into the brake-actuating device by way of the shut-off valve. The time available for this purpose is determined by the opening period of the shut-off valve. There is a correlation between the quantity of pressure fluid which flows in per time unit and the difference between the pressure in the brake-actuating device and the pressure in the braking pressure generator. The pressure in the braking pressure generator can be determined from this correlation.

These additional data can be taken into account for the calculation of the control operation.

As is known, the quality of control depends on the speed needed to increase and decrease the braking pressure and on the length of the pressure hold phases. These parameters must be varied, depending on whether braking is effected on a high or a low coefficient of friction. An indicator of the coefficient of friction is the adjusted braking pressure in consideration of the vehicle weight. The braking pressure can be determined as explained hereinabove. The vehicle weight can be determined by sensors. Thus, the time gradients of braking pressure increase and decrease can be determined. As has been explained above, braking pressure is reduced by energization of the coil of the actuating magnet of the braking pressure control valve so that the spring force is compensated. During braking pressure increase, initially, the opening pressure of the pressure control valve is increased, and the shut-off valve is then opened for short time intervals. This causes pressure build-up to take place in steps. The opening period of the shut-off valve can be fixed very precisely due to the knowledge of the instantaneous pressure in the brake-actuating device and the braking pressure generator because it can easily be determined, on the basis of the calculated pressure gradient, to what extent the pressure in the brake-actuating device will rise during the opening period. This permits adapting the stepwise pressure increase very precisely to an optimal pressure increase gradient.

Further, the stepwise pressure increase can be provided so that a minimum possible number of switching signals are necessary, which takes a direct effect on the noise development.

Also, the control operation can be the low-frequency type. The data acquired in previous control cycles, especially those about the friction conditions between tires and road surfaces, can be taken into account for the calculation for the following control cycle so that the brake slip can be adjusted more appropriately in the next control cycle, with the result that the control can be conformed more accurately to the transmission behavior of the control circuit (brake-wheel-road).

Besides, in vehicles having one front and one rear axle, data about the road conditions which are obtained by evaluating the above mentioned measured quantities on the front wheels can be taken into account for the control for the rear wheels.

The present invention will be described in the following by way of an embodiment and some diagrams.

DETAILED DESCRIPTION OF THE DRAWINGS

Figure 1:
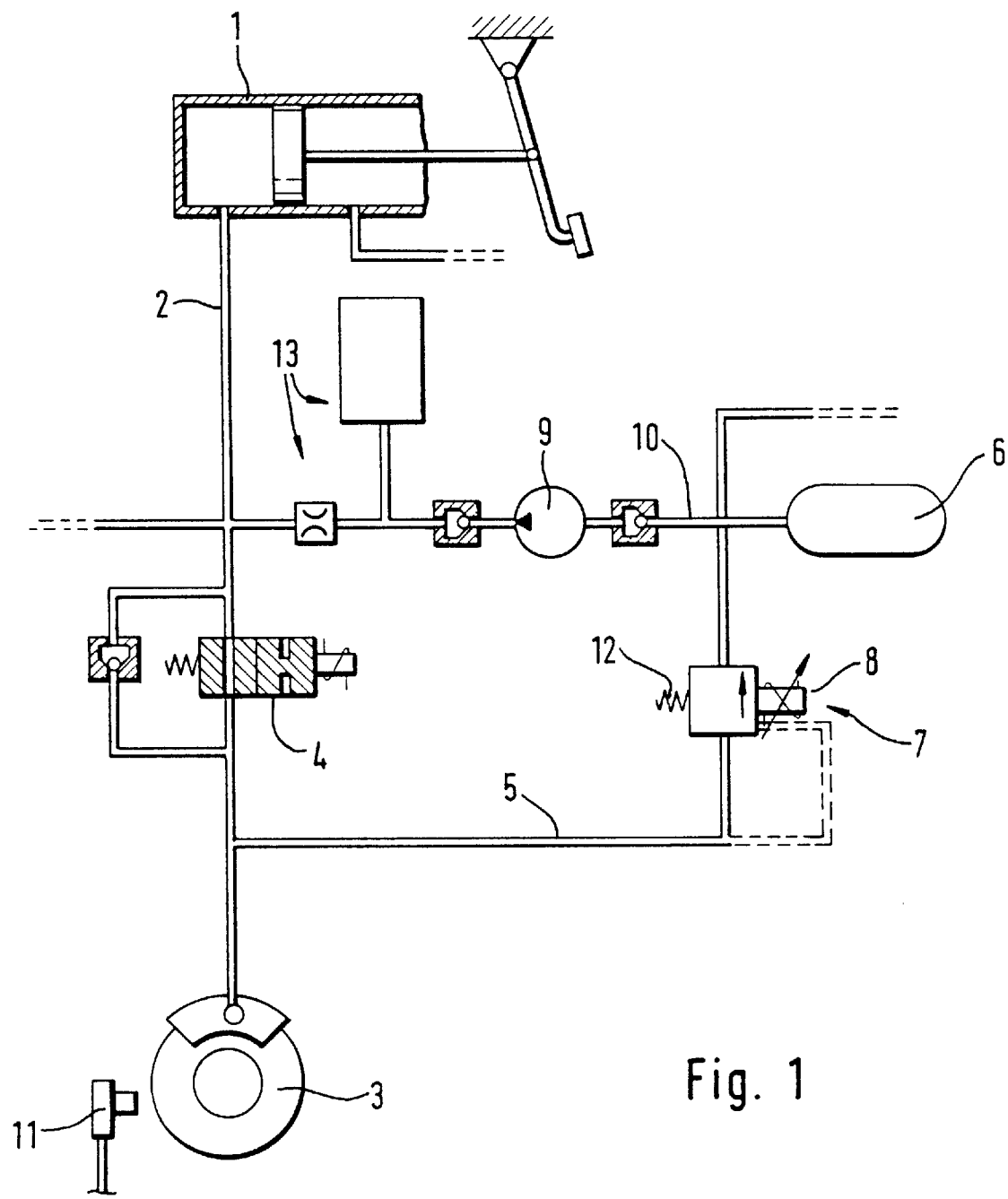
FIG. 1 is a view of the hydraulic circuit of a braking pressure control system.

Initially, FIG. 1 will be referred to. FIG. 1 is a schematic view of a brake system. The brake system includes a master cylinder 1 which is normally actuated by a pedal. The master cylinder is connected to a wheel cylinder 3 by way of a brake line 2. A shut-off or inlet valve 4 having two switching positions is provided in the brake line 2. In the initial or basic position of the valve, as shown in the drawing, the brake line is open, and the brake line is closed in the switched position.

An outlet line 5 is provided to decrease the pressure in the wheel cylinder. Line 5 leads to a low-pressure accumulator 6. The outlet line includes a pressure-limiting valve having an opening pressure which is adjustable by a proportionally operating magnet. The adjustable magnetic force of the proportional magnet 8 acts in opposition to a spring 12. As long as the proportional magnet 8 is deenergized, the force of spring 9 determines the opening pressure of the pressure-limiting valve 7. Energization of the proportional magnet causes reduction of the effective force of the spring 9 so that the opening pressure of the pressure-limiting valve 7 changes accordingly.

To perform a non-exhaustive control, a pump 9 returns pressure fluid from the low-pressure accumulator 6 to the master cylinder 1. Pump 9 is arranged in a pressure line 10 which connects the low-pressure accumulator 6 to the brake line 2 between the master cylinder 1 and the shut-off valve 4. Associated with the pressure line 10 is a damping device 13 by which pressure peaks at the output of the pump 9 are eliminated.

The brake system shown in FIG. 1 is of the return principle type. Further types of braking pressure control systems are known to the expert in the art. In an open-center system, the low-pressure accumulator 6 is replaced by a supply reservoir, for example. Further types of systems are known in the art where the pressure in the wheel brake is not directly controlled but conveyed by a plunger. Instead of the master cylinder, it is possible to employ other types of pressure generators, for example, accumulators with subsequent pedal-operated control valves. Also, the pressure generator may be designed so that the brake-actuating device is furnished with pressure fluid even if this is not desired by the driver. For example, this is necessary in traction slip control systems or so-called independent-force brake systems which are required in systems where the objective is to maintain the vehicle at a defined distance from the preceding vehicle.

Further, it is clear to the expert in the art that additional brake circuits can be associated with the master cylinder, and one brake circuit may comprise several wheel brakes.

So-called wheel sensors 11 are associated with the wheels of the vehicle. Sensors 11 determine the angular speed of the respective wheel. The corresponding sensor signals are sent to an evaluating unit 40. Unit 40, in turn, produces switching signals for the shut-off valve 4 which cause the shut-off valve 4 to switch from its open position (initial or basic position) to its closed or throttling position (switching position). The evaluating unit further produces a control signal for the pressure-limiting valve 7 to determine the current intensity which shall flow through the adjusting magnet. This defines the opening pressure of the pressure-limiting valve.

Different phases, i.e., a pressure decrease phase, a pressure hold phase and a pressure increase phase, are provided to control the pressure in the wheel cylinder 3.

The shut-off valve 4 is closed in the pressure decrease phase. The opening pressure of the pressure-limiting valve is set to a value which is below the pressure in the wheel cylinder 3. Therefore, pressure fluid is discharged from the wheel cylinder 3 into the low-pressure accumulator 6.

The shut-off valve 4 is closed in the pressure hold phase, and the opening pressure of the pressure-limiting valve 7 is adjusted to a value which is above the instantaneous pressure in the wheel cylinder. Therefore, the pressure in the wheel cylinder cannot open the pressure-limiting valve 7, with the result that pressure fluid cannot flow off from the wheel cylinder 3.

In a pressure increase phase, the shut-off valve 4 is opened, and the opening pressure of the pressure-limiting valve 7 is adjusted to a value above the instantaneous wheel cylinder pressure. The result is that pressure fluid can propagate from the master cylinder 1 to the wheel cylinder by way of the shut-off valve 4. This causes an increase in pressure which is limited by the opening pressure adjusted on the pressure-limiting valve 7.

Figure 2:
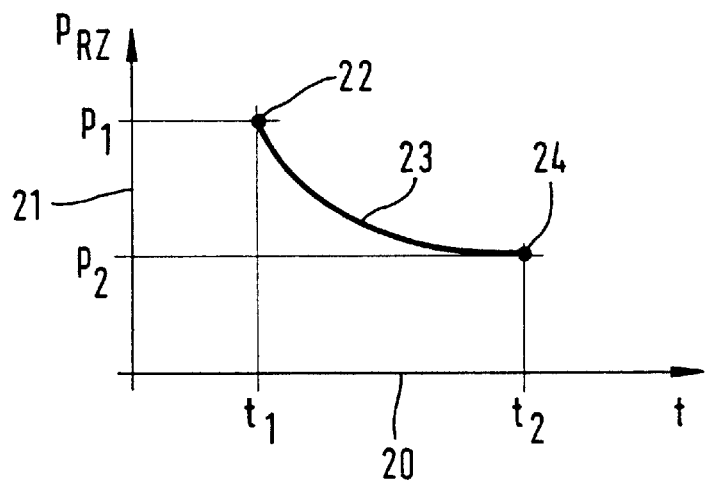
FIG. 2 shows the pressure variation in a pressure decrease phase.
Figure 3:
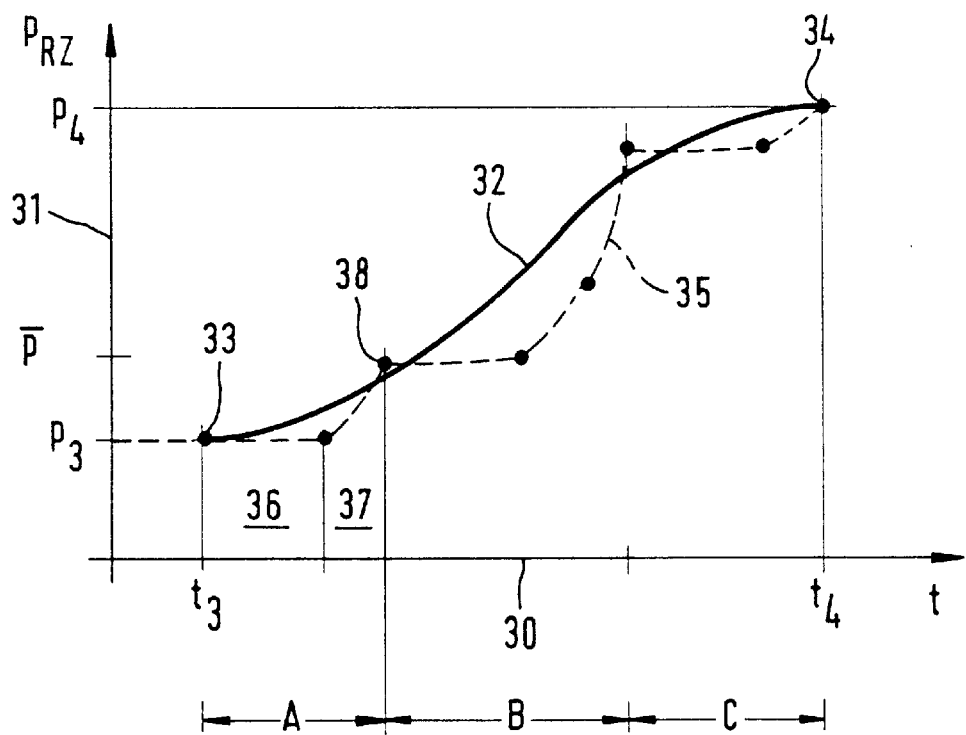
FIG. 3 shows the pressure variation in a pressure increase phase.

The typical variation of the pressure in the wheel cylinder 3 in a pressure decrease phase and in a pressure increase phase is shown in FIGS. 2 and 3.

FIG. 2 shows a diagram having an X-axis 20 where the progressing time t is plotted. The wheel cylinder pressure $p_{Rz}$ is plotted on the Y-axis 21. Point 22 marks a defined time $t_1$ and a defined wheel cylinder pressure $p_1$. The opening pressure of the pressure-limiting valve is in excess of pressure $p_1$ at time $t_1$. When the opening pressure of the pressure-limiting valve 7 is set to a value $p_2$, pressure fluid is discharged from the wheel cylinder 3 to the low-pressure accumulator, with the result that the pressure in the wheel cylinder 3 is decreased corresponding to the course of curve 23. The pressure decrease takes place until a second point 24 is reached, which is defined by the time $t_2$ and the wheel cylinder pressure p2 that corresponds to the opening pressure of the pressure-limiting valve. The pressure variation 23 is determined by the adjusted pressure differential $p_1$–$p_2$ and the opening cross-section of the pressure-limiting valve. Pressure variation 23 can be manipulated by the fact that the variation of the opening pressure of the pressure-limiting valve 7 does not take place in one step but in response to the desired change with time of the pressure decrease. This means that several pressure decrease steps according to FIG. 2 are combined to a uniform pressure decrease phase. This possibility of intervention is important because a too fast pressure decrease might cause excessive control actions in the control system. This is detrimental to the objective of adjusting an optimal pressure value which is as constant as possible.

FIG. 3 shows a typical course of a pressure increase phase. The time t is plotted on the X-axis 30 of the diagram. The wheel cylinder pressure $p_{rz}$ is plotted on the Y-axis 31. The solid line 32 indicates the change of the wheel cylinder pressure with time which would be optimal for the control. Line 32 leads from a diagram point 33 at time $t_3$ with pressure $p_3$ to a diagram point 34 at time $t_4$ and pressure $p_4$. A pressure hold phase lies before time $t_3$. A pressure hold phase or a pressure decrease phase shall follow time $t_4$.

Curve 32 represents a pattern which is calculated by the evaluating unit, based on data of the wheel sensor and further data, the acquisition of which will be described hereinbelow.

The dotted line 35 represents a possible actual course of the pressure curve. The dotted line is allowed to deviate from the ideal line 32 only to a slight extent. To this end, pressure increase is effected in several steps which are referred to by A, B, and C on the time axis. Each individual step has the same principal design and includes a first phase 36 and a second phase 37. The shut-off valve is still closed in the first phase. The opening pressure of the pressure-limiting valve 7 is set to a first value p which shall be reached at the end of a step. Because the opening pressure of the pressure-limiting valve 7 is in excess of the instantaneous wheel cylinder pressure, and the shut-off valve 4 is closed, the pressure in the wheel cylinder 3 remains constant. The shut-off valve is opened at the end of the first phase 36 at a time $t_3$. Pressure fluid can now flow from the master cylinder 1 to the wheel cylinder 3. The pressure rises until the adjusted opening pressure of the pressure-limiting valve p is reached.

The pressure variation in the second phase 37 is determined by the throttle cross-section of the shut-off valve 4 and the difference in pressure between the master cylinder and the wheel cylinder.

The point reached is designated by reference numeral 38 in the diagram, the start of a new pressure increase step.

The time $t_3$ and the preset pressure p is calculated by the evaluating unit, as will be explained in the following.

The further steps B and C basically correspond to step A and also include a first and a second phase. The respectively preset pressure p and the change-over time t in relation to the duration of the step can be varied.

Figure 4:
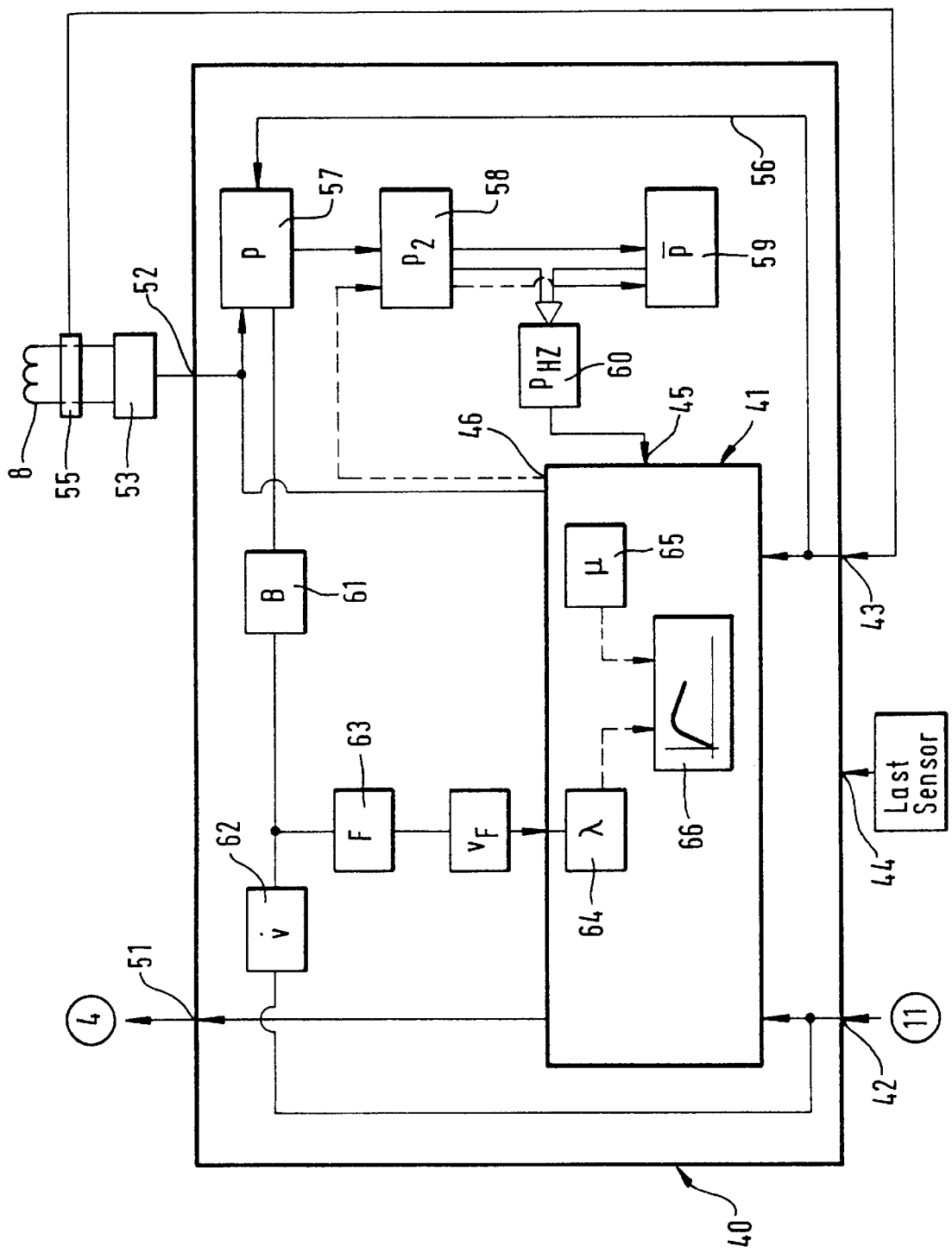
FIG. 4 is a schematic view of the main components and the linkings of an electronic circuit for the control of the system according to FIG. 1.

Initially, the wheel cylinder pressure is determined to acquire the data which are necessary to adjust the respectively intended pressure variation. The method is explained by way of FIG. 4 which is a schematic block diagram. Reference numeral 40 designates the entire evaluating unit which comprises a signal generator 41 as the basic item.

The evaluating unit 40 includes several inputs. Wheel sensor 11 (FIG. 1) is connected to an input 42. Therefore, data about the instantaneous angular speed of the wheel are present at input 42. The connections of the wheel sensors of the further wheels of the vehicle are not shown. A measuring device 55 is connected to a further input 43 and records variations in the induction of the actuating coil 8 of the pressure-limiting valve 7. In this embodiment, several inputs are provided corresponding to the number of the pressure-limiting valves in the brake system.

Another input 44 receives a signal which corresponds to the vehicle weight or the load distribution to the axles of the vehicle. Also, outputs are provided. A signal at an output 51 causes change-over of the shut-off valve 4. Several outputs 51 are provided corresponding to the number of the shut-off valves 4 in the control system. Another output 52 leads to a device 53 which controls the current supply of the coil 8 of the pressure-limiting valve 7. The number of outputs 52 corresponds to the number of the pressure-limiting valves 7. As explained hereinabove, the coil current has a defined ratio to the opening pressure of the pressure-limiting valve 7. The control signal at the output 52 represents the opening pressure of the pressure-limiting valve 7.

A monitoring device 55 is provided in the supply circuit for the coil 54. The monitoring device 55 reacts to current or voltage variations in the supply circuit for the coil 8 which are caused when the inductance of the coil changes as a function of a movement of the armature. As has been explained hereinabove, a like movement always indicates an opening or closing operation of the pressure-limiting valve 7. This signal is conducted to the corresponding input 43. Input 43 is directly connected to the signal generator 41. A line leads also to a read-out unit 57. When a signal prevails at input 43, the signal is read out at output 52 and memorized as a pressure value p in the read-out unit 57. As has been explained hereinabove, the adjusted opening pressure corresponds to the momentary wheel cylinder pressure in closing or opening operations of the pressure-limiting valve. It becomes apparent that pressure is measured this way without a separate pressure sensor becoming necessary. Connected downstream of the read-out unit 57 are further memories 58, 59 which store special pressure values at defined times. The read-out operation of the special pressure values from the read-out unit 57 is effected on command of a control signal which is produced by the signal generator 41 at an output 46. The pressure is stored at the end of a pressure decrease phase in a memory 59 (point 24 in FIG. 2). This pressure corresponds to the pressure at the beginning of a pressure increase phase (point 33 in FIG. 3). The pressure is stored at the end of a first increase phase in memory 58 (point 38 in FIG. 3).

The two memory values are supplied to a unit 60 which calculates the master cylinder pressure. This pressure results from the difference of the two above-mentioned pressures, the duration for the opening of the shut-off valve within the first pressure increase step A and the known data of the shut-off valve 4 with respect to its hydraulic rating. The calculated master cylinder pressure is conducted to the signal generator 41 in an input 45 and used to calculate a pressure build-up which approaches the ideal pressure build-up very closely. To this end (which is not represented in detail), the wheel cylinder pressure is read out from the memory 59, and the required opening time for the shut-off valve is calculated from the comparison with the master cylinder pressure in the calculating unit 60 in order to reach an ideal pressure build-up.

The values of the read-out unit 57, along with the signals of the wheel sensor, can be used to determine the respective wheel slip. Also, the coefficient of friction can be determined in combination with the signals of a load sensor.

Initially, an actuating force B is determined (in unit 61) from the pressure value which is stored in the read-out unit 57. The wheel deceleration can be calculated (in unit 62) from the wheel sensor signals at the input 42. From the actuating force 61 and the wheel deceleration 62, the brake force is determined as the force F which acts between the tires and the road surface. The calculation is effected in the unit 63 and can be performed according to the principles named in the above-mentioned British publication.

Having information about the speed at the beginning of braking, the instantaneous vehicle speed is obtained by integrating the brake force. Because the pressure in the wheel brake is not measured continuously but in intervals, it will be necessary to intrapolate the pressure values or the brake forces resulting therefrom.

The vehicle speed can now be combined with the wheel rotational speeds, and the respective wheel slip can be determined (memory 64 in the signal generator 41).

With respect to the brake force in the memory 63, the instantaneous coefficient of friction can be determined in consideration of the load which is sensed by a load sensor. The coefficient of friction can be stored in the memory 65 in the signal generator.

Because the wheel undergoes various slip values during a braking operation, the adhesion coefficient/slip curve of the wheel for the actual road surface can be determined. The curve can be stored in a memory 66 and characterized by a small number of parameters.

Gradually, curves for various road surfaces are stored in the memory.

In a repeated braking operation under similar conditions, the corresponding curve can be determined already after one or two measurements of slip/adhesion coefficient pairs and taken into account for the control in further calculations. The system is a self-learning system which elaborates on its own the parameters of the road surface/tires combination and continuously corrects them.

The signal generator must also contain an adjustment between the front wheels and the rear wheels. This means that the actual coefficients of friction found or the actual slip/coefficients-of-friction curve which is determined at the front wheels normally applies also to the rear wheels because they move in the same track. At least, the slip/ coefficients-of-friction curve found on the front wheels in a first approximation can be made the basis for the control operation for the rear wheels.

We claim:

1. Braking pressure control system including a braking pressure generator, a brake-actuating device for at least one vehicle wheel, a connecting, line between the braking pressure generator and the brake-actuating device, a shut-off valve in the connecting line which has two switching positions, the connecting line being open in the basic position of the shut-off valve and the connecting line being at least throttled in the switched position of the shut-off valve, an outlet line which connects the brake-actuating device with a pressure fluid collecting means, an electromagnetically operated pressure-limiting valve with an actuating coil in the outlet line, a wheel sensor which senses the rotational speed of the vehicle wheel and issues a corresponding sensor signal, and an electrical controlling and evaluating unit which has an input for the sensor signal and a switching output to which a switching signal for the shut-off valve is applied, and a control output which issues a control signal for the current-supply circuit of the coil of the pressure-limiting valve which determines the intensity of the coil current, wherein the coil circuit is associated with a measuring device which determines a current/voltage variation due to a change in the induction of the coil and sends a corresponding signal to another input of the evaluating unit; and wherein the evaluating unit memorizes a value which corresponds to the coil current at the time a pressure-limiting valve signal is received at the input, wherein this value is converted into a braking pressure value and is intermediately stored, and wherein the braking pressure value is taken into account for the control process for adjusting an optimal slip value.

2. Brake system as claimed in claim 1, wherein the evaluating unit is so designed that when pressure decrease becomes necessary, a decrease signal is issued at the switching output causing the shut-off valve to change from its basic position to its switched position, and wherein a control signal is applied to the control output so that the coil of the pressure-limiting valve is supplied with current corresponding to a decreasing opening pressure.

3. Brake system as claimed in claim 1, wherein the unit is so designed that when a pressure increase becomes necessary, a control signal is issued at the control output which corresponds to an opening pressure that is higher than the preceding pressure, and wherein a switching signal is set at the switching output so that the shut-off valve is set to its open position at least for a short time.

* * * * *